US008848490B2

(12) United States Patent
Hanabusa

(10) Patent No.: US 8,848,490 B2
(45) Date of Patent: Sep. 30, 2014

(54) GPS RECEPTION APPARATUS AND POSITIONAL CALCULATION METHOD FOR THE SAME

(71) Applicant: Casio Computer Co., Ltd., Tokyo (JP)

(72) Inventor: Toshio Hanabusa, Kawasaki (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/707,939

(22) Filed: Dec. 7, 2012

(65) Prior Publication Data

US 2013/0099964 A1    Apr. 25, 2013

Related U.S. Application Data

(62) Division of application No. 12/717,275, filed on Mar. 4, 2010, now Pat. No. 8,390,511.

(30) Foreign Application Priority Data

Mar. 6, 2009   (JP) .................................. 2009-052749
Mar. 6, 2009   (JP) .................................. 2009-052750

(51) Int. Cl.
| G04R 20/02 | (2013.01) |
| G01S 19/14 | (2010.01) |
| G01S 19/24 | (2010.01) |
| G01S 19/50 | (2010.01) |
| G01S 19/25 | (2010.01) |
| G01S 19/27 | (2010.01) |

(52) U.S. Cl.
CPC ............... *G01S 19/50* (2013.01); *G01S 19/258* (2013.01); *G01S 19/27* (2013.01)
USPC ..... 368/47; 368/21; 342/357.52; 342/357.63; 342/357.33

(58) Field of Classification Search
USPC .............. 368/47, 14, 21; 342/357.52, 357.63, 342/357.25, 357.33
IPC ......................... G01S 19/14,19/24, 19/42, 19/50
See application file for complete search history.

(56) References Cited

U.S. PATENT DOCUMENTS

| 5,504,492 A | 4/1996 | Class et al. |
| 6,014,610 A | 1/2000 | Judge et al. |

(Continued)

FOREIGN PATENT DOCUMENTS

| JP | 2004-61336 A | 2/2004 |
| JP | 2007-263598 A | 10/2007 |

*Primary Examiner* — Gregory C Issing
*Assistant Examiner* — Fred H Mull
(74) *Attorney, Agent, or Firm* — Holtz Holtz Goodman & Chick PC

(57) ABSTRACT

A reception apparatus includes a first determination unit to determine whether a state exists in which timing information and six orbital elements information can be obtained from GPS signals transmitted by only two GPS satellites. When the state exists, a calculation unit calculates a trajectory line having a predetermined width on a surface of the earth, based on the GPS signals transmitted by the two satellites. A second determination unit determines whether the trajectory line traverses a district of use stored by the apparatus. A time correcting unit obtains a current time using the obtained timing information, by correcting the timing information based on a time zone corresponding to the district of use, when the trajectory line traverses the district of use. The time correcting unit does not obtain the current time using the obtained timing information when the trajectory line does not traverse the district of use.

12 Claims, 9 Drawing Sheets

(56) References Cited

U.S. PATENT DOCUMENTS

| | | |
|---|---|---|
| 6,684,158 B1 | 1/2004 | Garin et al. |
| 2005/0135194 A1* | 6/2005 | Ishii ............................... 368/47 |
| 2006/0071851 A1 | 4/2006 | Graas et al. |
| 2008/0238769 A1* | 10/2008 | Verechtchiagine ...... 342/357.12 |
| 2009/0190444 A1* | 7/2009 | Akiyama et al. ................ 368/14 |

* cited by examiner

FIG.7

| INFORMATION TYPE | SUBFRAME NUMBER | WORD NUMBER | CONTENTS |
|---|---|---|---|
| SATELLITE TIME | 1 | 7 | GROUP DELAY |
| | | 8 | EPOCH TIME (CLOCK) |
| | | 9 | CLOCK CORRECTION COEFFICIENT |
| | | 9 | CLOCK CORRECTION COEFFICIENT |
| | | 10 | CLOCK CORRECTION COEFFICIENT |
| SATELLITE ORBIT (EPHEMERIS) | 2 | 3 | SINE CORRECTION COEFFICIENT FOR ORBITAL RADIUS |
| | | 4 | CORRECTION VALUE FOR MEAN MOTION |
| | | 4, 5 | MEAN PERIGEE ANGLE (E1) |
| | | 6 | COSINE CORRECTION COEFFICIENT FOR ARGUMENT OF LATITUDE |
| | | 6, 7 | ECCENTRICITY (E2) |
| | | 8 | SINE CORRECTION COEFFICIENT FOR ARGUMENT OF LATITUDE |
| | | 8, 9 | ROOT SQUARE OF ORBITAL RADIUS (E3) |
| | | 10 | EPOCH TIME (ORBIT) |
| SATELLITE ORBIT (EPHEMERIS) | 3 | 3 | COSINE CORRECTION COEFFICIENT FOR ORBITAL INCLINATION |
| | | 3, 4 | RIGHT ASCENSION OF ASCENDING NODE (E4) |
| | | 5 | SINE CORRECTION COEFFICIENT FOR ORBITAL INCLINATION |
| | | 5, 6 | ORBITAL INCLINATION (E5) |
| | | 7 | COSINE CORRECTION COEFFICIENT FOR ORBITAL RADIUS |
| | | 7, 8 | ARGUMENT OF PERIGEE (E6) |
| | | 9 | RATE OF CHANGE IN $\Omega$0 |
| | | 10 | RATE OF CHANGE IN I0 |
| SATELLITE ORBIT (ALMANAC) | 4 OR 5 | 3 | SATELLITE NUMBER |
| | | 3 | ECCENTRICITY (E1) |
| | | 4 | EPOCH TIME (ALMANAC ORBIT) |
| | | 4 | DIFFERENCE IN ORBIT INCLINATION (E2) |
| | | 5 | RATE OF CHANGE IN $\Omega$0 |
| | | 6 | ROOT SQUARE OF ORBITAL RADIUS (E3) |
| | | 7 | RIGHT ASCENSION OF ASCENDING NODE (E4) |
| | | 8 | ARGUMENT OF PERIGEE (E5) |
| | | 9 | MEAN PERIGEE ANGLE (E6) |
| | | 10 | CLOCK CORRECTION COEFFICIENT |
| | | 10 | CLOCK CORRECTION COEFFICIENT |

US 8,848,490 B2

GPS RECEPTION APPARATUS AND POSITIONAL CALCULATION METHOD FOR THE SAME

CROSS-REFERENCE TO RELATED APPLICATIONS

This application is based upon and claims the benefit of priority from prior Japanese Patent Applications No. 2009-052749, filed Mar. 6, 2009; and No. 2009-052750, filed Mar. 6, 2009, the entire contents of both of which are incorporated herein by reference.

BACKGROUND OF THE INVENTION

1. Field of the Invention

The present invention relates to a GPS reception apparatus configured to calculate current position based on satellite information on a plurality of satellites obtained from GPS signals, and a positional calculation method for the GPS reception apparatus.

2. Description of the Related Art

Various Global Positioning System (GPS) reception apparatuses are commonly used for different purposes; GPS reception apparatuses measure the current position by utilizing GPS to receive electromagnetic signals transmitted by a plurality of satellites. The GPS reception apparatus acquires at least four GPS satellites based on the general positions of the respective GPS satellites indicated by almanac information pre-obtained from the GPS satellites. The GPS reception apparatus then utilizes ephemeris information contained in a GPS signal received from each of the GPS satellites, that is, navigation data (satellite information), to accurately calculate positional information on a user (see, for example, Jpn. Pat. Appln. KOKAI Publication No. 2004-61336).

On the other hand, the navigation data includes time information from a precise clock provided in each satellite, that is, time-of-week (TOW) that is a numerical value in units of 6 seconds counted from 00:00:00 on every Sunday. Thus, the accurate current time can be obtained from the time information (see, for example, Jpn. Pat. Appln. KOKAI Publication No. 2007-263598).

If the accurate current time is obtained from the time information included in the navigation data, then since a time reference for GPS (GPS time) is coordinated universal time (UTC), the time obtained from the time information needs to be corrected in accordance with a time difference from UTC, which is a standard time adopted in a district (a country or the like) to which the current position (the place where the user is present) belongs, in order to obtain the correct current time.

However, if the GPS reception apparatus is incorporated in a portable electronic machine, for example, a watch, when the user is in an alley surrounded by buildings, in a place surrounded by trees, or in a house or the user is moving with the GPS reception apparatus, then a number of satellites required to calculate the current position cannot be acquired. Even if a required number of satellites can be acquired, reception sensitivity is low, and ephemeris information often fails to be obtained from the GPS signal. In this case, even though the time information can be obtained, the current position cannot be calculated. As a result, the correct current time cannot be obtained.

Furthermore, to avoid the above-described circumstances, the operation of receiving GPS signals need to be repeated until ephemeris information is obtained. However, in this case, time setting involves high power consumption, thus reducing the continuous operation time of the apparatus. In particular, disadvantageously, if small batteries such as coin-shaped ones are used, the continuous operation time decreases significantly.

BRIEF SUMMARY OF THE INVENTION

The present invention is directed to method and apparatus that substantially obviates one or more of the problems due to limitations and disadvantages of the related art.

According to an embodiment of the present invention, a reception apparatus comprises:

a reception unit configured to receive global positioning system signals transmitted by a plurality of satellites to obtain satellite information;

a determination unit configured to determine whether or not a state in which the reception unit receives the global positioning system signals is a predetermined reception state; and a positional calculation unit configured to calculate a current position based on ephemeris information and almanac information when the determination unit determines the reception state for the global positioning system signals is the predetermined reception state, the ephemeris information including at least six orbital elements and being obtained from satellite information of first and second satellites among satellite information of three satellites which are obtained by the reception unit, and the almanac information including at least six orbital elements on a general orbit of a third satellite of the three satellites. According to another embodiment of the present invention, a positional calculation method comprises:

determining whether or not a state in which global positioning system signals transmitted by a plurality of satellites are received is a predetermined reception state; and calculating a current position based on ephemeris information and almanac information when the reception state is determined to be the predetermined reception state, the ephemeris information including at least six orbital elements and being obtained from satellite information of first and second satellites among satellite information of three satellites which are obtained by receiving the global positioning system signals, and the almanac information including at least six orbital elements on a general orbit of a third satellite of the three satellites.

According to a still another embodiment of the present invention, a reception apparatus comprises:

a storage unit configured to store a set district of use of the reception apparatus;

a reception unit configured to receive global positioning system signals transmitted by a plurality of satellites to obtain satellite information;

a first determination unit configured to determine whether or not a state in which the reception unit receives the global positioning system signals is a predetermined reception state;

a calculation unit configured to calculate a band-like trajectory lines on a earth surface containing a current position and having a predetermined width based on satellite information on two satellites for which the global positioning system signals have been successfully received when the first determination unit determines the reception state for the global positioning system signals is the predetermined reception state;

a second determination unit configured to determine whether or not the district of use has changed based on whether or not the trajectory line calculated by the calculation unit traverses the district of use stored in the storage unit; and a time correcting unit configured to correct a time indicated by time information to a current time corresponding to the district of use stored in the storage unit when the second determination unit determines that the district of use has not changed.

According to a still another embodiment of the present invention, a current time obtaining method comprises:

determining whether or not a state in which global positioning system signals transmitted by a plurality of satellites are received is a predetermined reception state;

calculating a band-like trajectory line on a earth surface containing a current position and having a predetermined width based on satellite information on two satellites for which the global positioning system signals have been successfully received when the reception state is determined to be the predetermined reception state, determining whether or not the district of use has changed based on whether or not the calculated trajectory line traverses a district of use stored in a storage unit; and correcting a time indicated by time information to a current time corresponding to the district of use stored in the storage unit when the district of use is determined not to have changed.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention.

FIG. 7 is a diagram of a data configuration showing the integral part of navigation data.

DETAILED DESCRIPTION OF THE INVENTION

Figure 1:
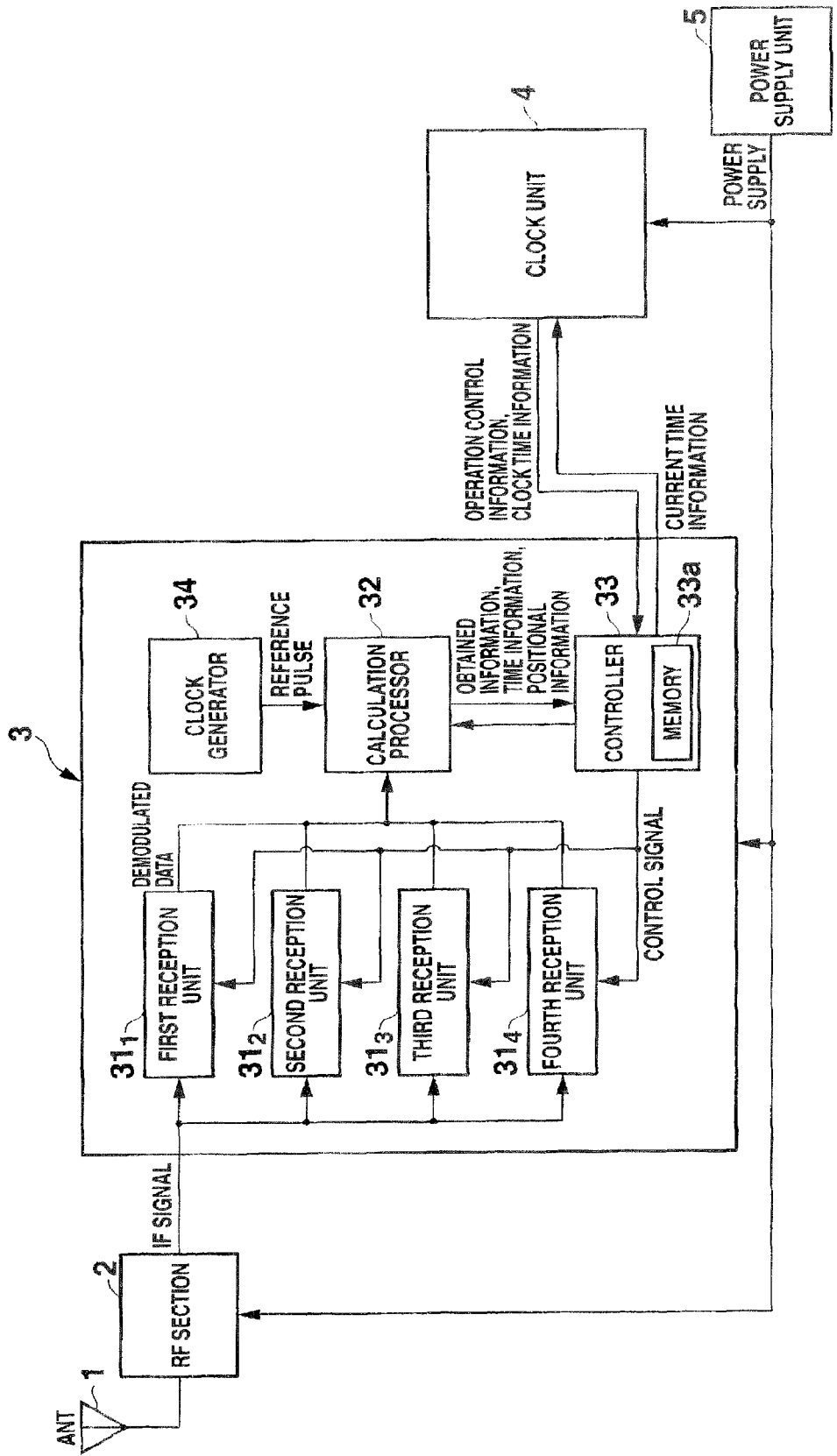
FIG. 1 is a block diagram showing a GPS reception apparatus according to an embodiment of the present invention.

An embodiment of a GPS reception apparatus according to the present invention will now be described with reference to the accompanying drawings. FIG. 1 is a block diagram showing the configuration of a GPS reception apparatus according to the embodiment of the present invention. As shown in FIG. 1, the GPS reception apparatus comprises an antenna 1, an RE unit 2, a GPS receiver 3, a clock unit 4, and a power supply unit 5.

Although not shown in the drawings, the RF unit 2 includes a high-frequency amplifying circuit configured to amplify reception signals input through the antenna 1, that is, GPS signals, a frequency conversion circuit configured to convert each of the amplified high-frequency signals into an intermediate-frequency signal, and an analog-to-digital conversion circuit configured to convert the intermediate-frequency signal into a digital signal. The RF unit 2 thus converts the input GPS signal into the digital, intermediate-frequency (IF) signal and then outputs the resultant signal to the GPS receiver 3.

The GPS receiver 3 comprises a first reception unit $31_1$ to a fourth reception unit $31_4$ for respective four channels which are configured to simultaneously receive electromagnetic signals transmitted by GPS satellites (hereinafter simply referred to as satellites), that is, four satellites required for accurate positioning, a calculation processor 32, a controller 33, and a clock generator 34.

Figure 2:
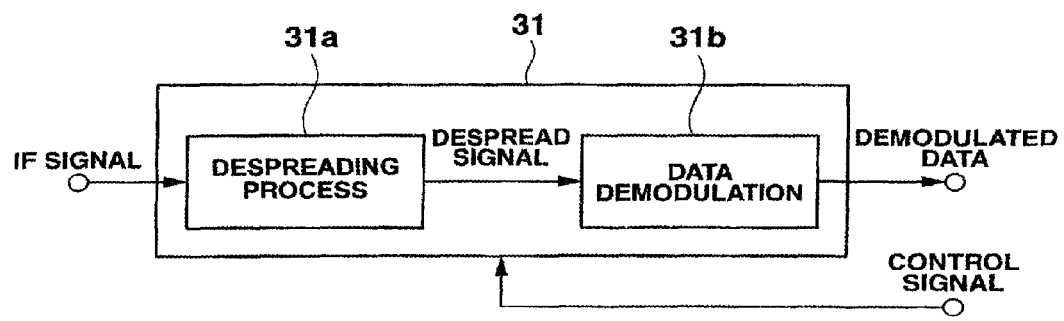
FIG. 2 is a block diagram showing the details of a reception unit.

The reception units $31_1$ to $31_4$ have the same configuration. FIG. 2 is a block diagram showing the details of the reception unit $31_1$ by way of example. The reception unit $31_1$ is reception means according to the present invention and comprises a despreading processor $31a$ and a data demodulator $31b$. The despreading processor $31a$ subjects the intermediate-frequency signal received from the RF unit 2 to a despreading process using a spreading code varying among the satellites. The resultant despreading signal is transmitted to the data demodulator $31b$, which subjects the signal to BPSK demodulation and then outputs the resultant demodulation data to the calculation processor 32. The despreading signal may be analog or digital or may be based on software. Here, the despreading signal has an amplitude corresponding to the intensity of the input GPS signal. The despreading signal cannot be demodulated at a given level or lower because of an increase in the number of errors.

The calculation processor 32 is general positional calculation means according to the present invention. The calculation processor 32 obtains timing information, that is, a navigation data transmission timing for each satellite, from navigation data superposed in the demodulation data received from the corresponding one of the reception units $31_1$ to $31_4$, that is, the GPS signal, based on a reference pulse generated by the clock generator 34. The calculation processor 32 then calculates the orbital position of each of the satellites based on the corresponding demodulation data. The calculation processor 32 then calculates the reception position (current position) based on the timing information and the orbital position. The calculation processor 32 then transmits the resultant positional information to the controller 33 together with the timing information. The calculation processor 32 also transmits time information on the satellite obtained from the demodulation data, to the controller 33. The calculation processor 32 further transmits, to the controller 33, acquisition information indicating whether or not information required to calculate the reception position has been obtained.

The controller 33 controls the whole GPO receiver 3 in response to requests from the clock unit 4. The controller 33 controls the operation of each component of the GPO receiver 3 as well as the operation of the calculation processor 32. In this case, the controller 33 functions as determination means, reception control means, and second reception control means according to the present invention. The controller 33 also functions as time obtaining means according to the present invention. The controller 33 thus corrects the time indicated by time information on the satellites transmitted by the calculation processor 32, depending on the current position. The controller 33 then transmits the corrected current time to the clock unit 4 as current time information. The controller 33 also transmits the name of a city including the reception position indicated by the positional information, to the clock unit 4 as general positional area information.

Furthermore, the controller 33 includes a memory 33a configured to store program data required to control the operations of the GPS receiver 3 and the calculation processor 32, and area information. The area information comprises time zone information (latitude, longitude, and the like, required to determine districts with the same time difference) indicative of a plurality of districts (time zones) with the same time difference from UTC, general positional area information indicative of a particular district area, area information indicative of an area on a map relating to a particular area, and the time zones corresponding to the respective areas.

Here, the general positional area information is, for example, the names of cities in the world (in Japan, the names of cities, towns, and villages), the names of stations, and landmarks. In a time setting operation described below, the general positional area information (names of cities and the like) stored in the memory 33a and indicating the particular district area to which the reception position corresponds.

Furthermore, the data stored in the memory 33a can be rewritten, and the memory 33a can also store the latest almanac information obtained at the beginning of use of the GPS reception apparatus or at any point in time, the city name of a point of use determined in the time setting operation described below, and a city name preset (pre-selected) by a user as a point of use.

The clock unit 4 comprises a clock circuit section configured to count the current time, a register configured to store dates, a setting memory configured to various pieces of setting information such as information on the currently set time zone which information is varied as required, a display section comprising a small-sized LCD and configured to display, for example, the current time, the date, and the city name, required to check the time zone, a control section configured to control (turn on and off) the operations of these components and the GPS receiver 3, and a plurality of operation buttons; these components of the clock unit 4 are not shown in the drawings.

The power supply unit 5 comprises small batteries such as coin-shaped batteries, solar batteries, or rechargeable batteries and a DC/DC converter. The power supply unit 5 supplies the RF unit 2, the GPS receiver 3, and the clock unit 4 with power required for operation.

When the user depresses a predetermined operation button at any point in time, the GPS reception apparatus configured as described above performs the time setting operation. In the time setting operation, the GPS receiver 3 transmits the accurate current time based on time information on the satellites and the above-described general positional area information to the clock unit 4. Furthermore, the clock unit 4 updates the time, the city name indicative of the district area of the point of use, and the like.

The specific contents of operations of the GPS reception apparatus in the time setting operation will be described below with reference to the flowcharts in FIGS. 3, 4, and 5. In the description below, it is assumed that effective almanac information obtained at most a predetermined period (several months) earlier is stored in the memory 33a.

Figure 3:
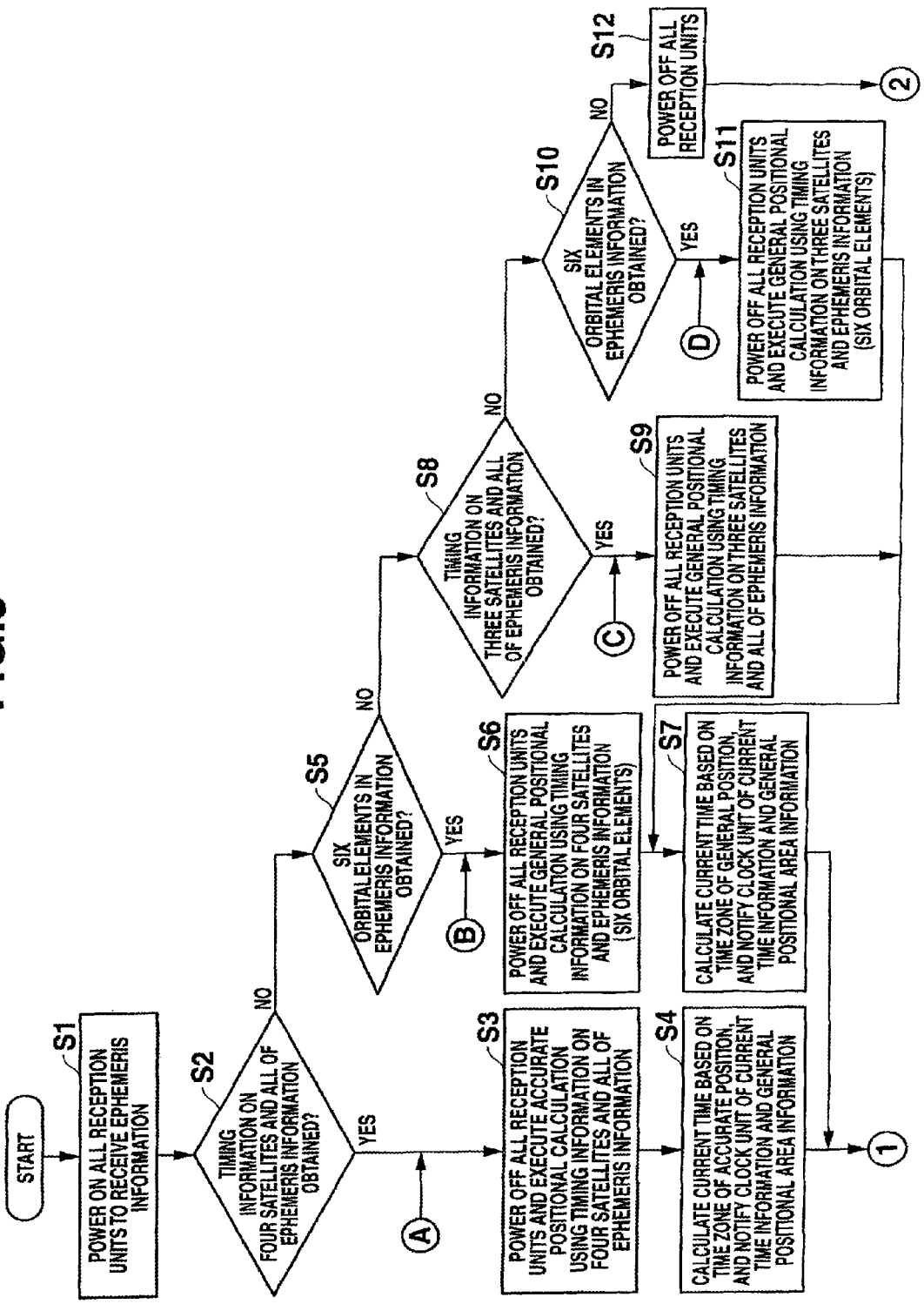
FIG. 3 is a flowchart showing the contents of a time setting operation.
Figure 4:
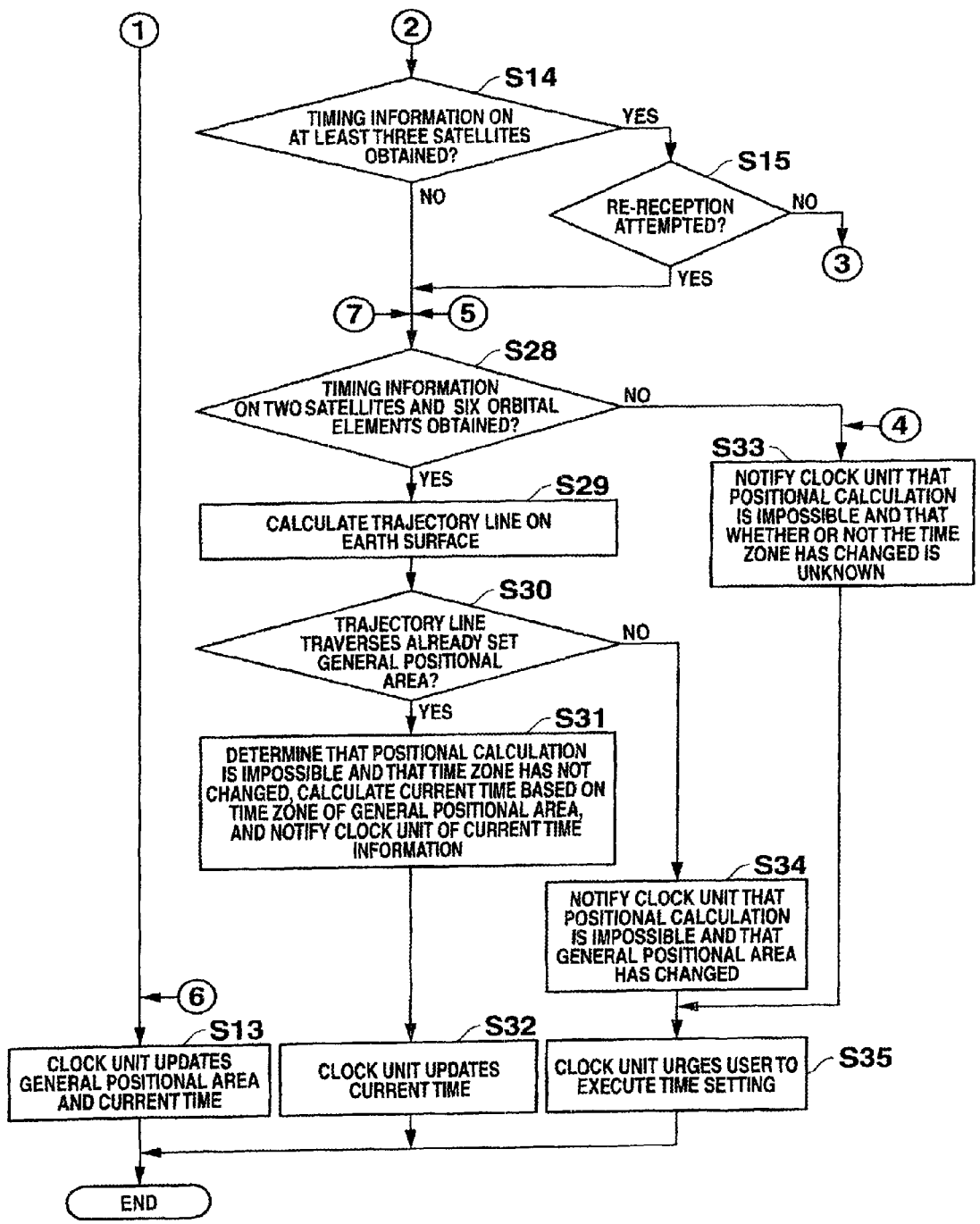
FIG. 4 is a flowchart continued from FIG. 3 and showing the contents of the time setting operation.
Figure 5:
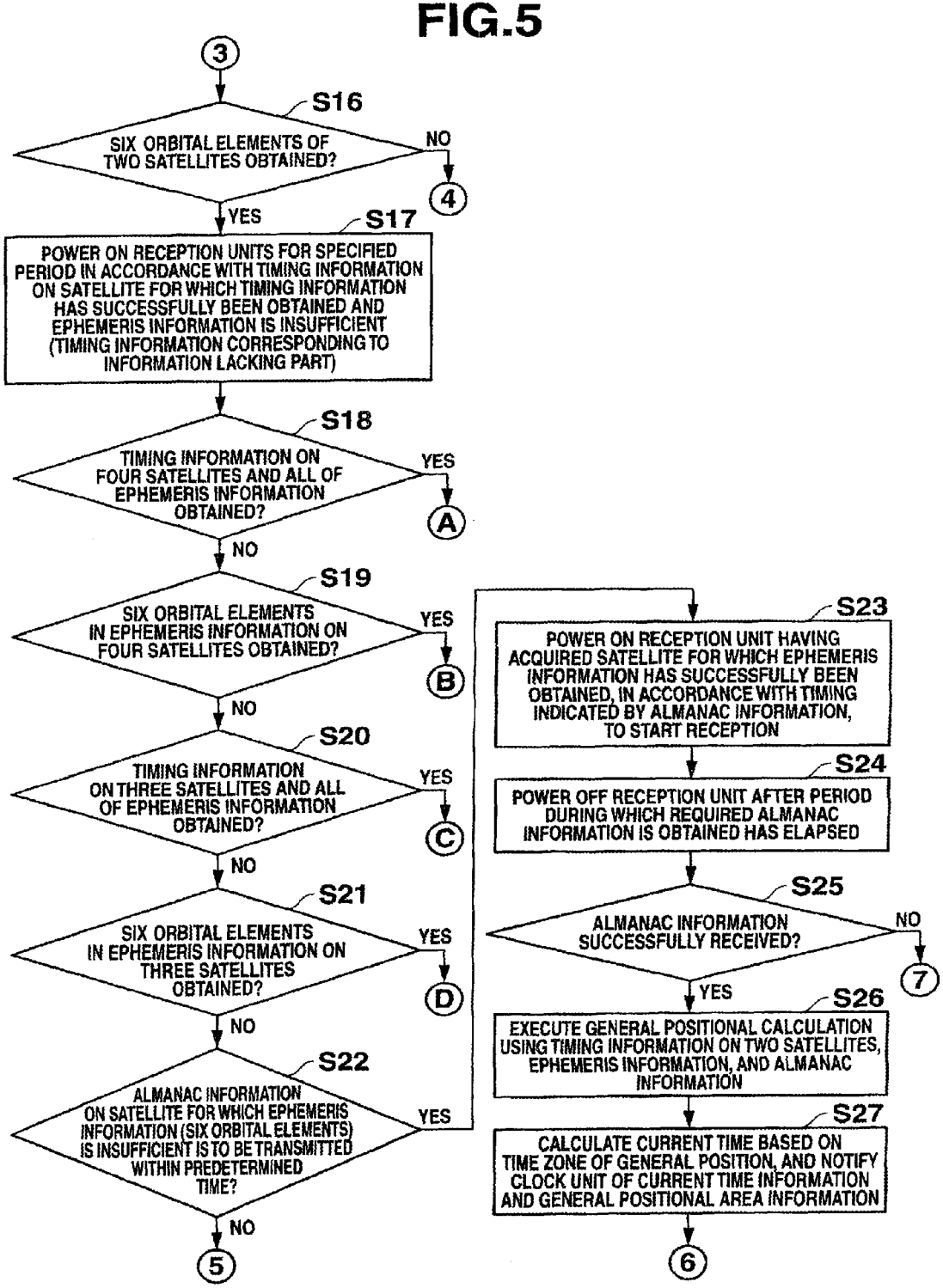
FIG. 5 is a flowchart continued from FIG. 4 and showing the contents of the time setting operation.

FIGS. 3, 4, and 5 are flowcharts showing the process procedure of the time setting operation performed mainly by the controller 33 of the GPS receiver 3. As shown in FIG. 3, the controller 33 starts operation when the clock unit 4 starts supplying power to the GPS receiver 3 in response to the user's button operation. The controller 33 immediately powers on all the reception units 31 for the respective four channels at a predetermined timing, to start an operation of receiving GPS signals (ephemeris signals) (step S1). The timing for powering on the reception unit 31 is determined based on the current time information transmitted by the clock unit 4 and the almanac information stored in the memory 33a. Thereafter, the controller 33 executes processing in accordance with an environment in which electromagnetic signals transmitted by the satellites as described below are received, that is, the number of successfully acquired satellites and the contents of satellite information actually successfully obtained from reception signals.

Figure 6:
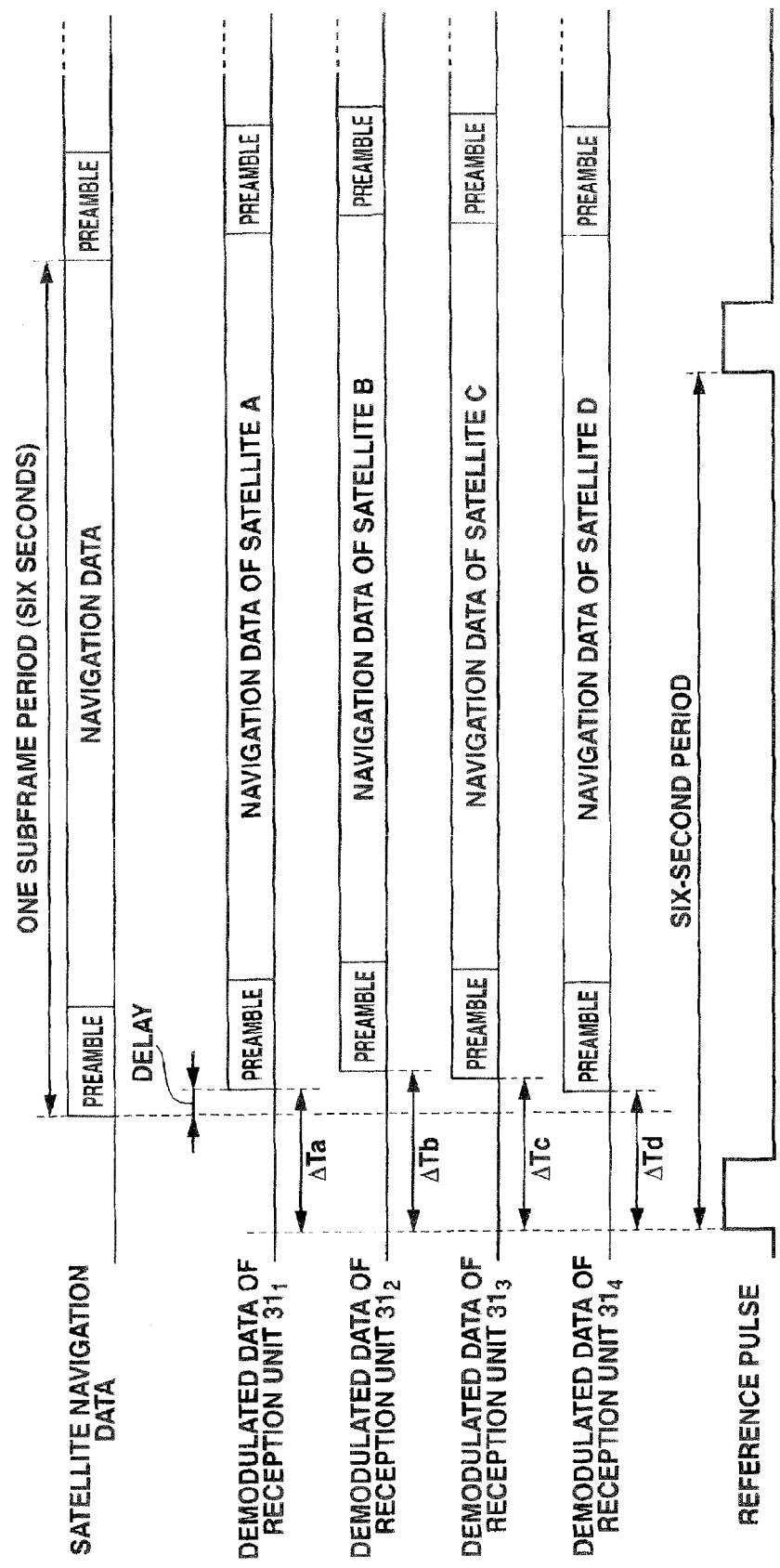
FIG. 6 is a timing chart showing differences in navigation data transmission timing among a plurality of satellites.

Here, the acquisition of the satellites refers to an operation of synchronizing with transmission timings for navigation data transmitted by the satellites to obtain timing information on each satellite. FIG. 6 is a timing chart showing differences in navigation data transmission timing among GPS signals. FIG. 6 particularly shows a portion of the navigation data which corresponds to the first of five subframes transmitted with a period of 6 seconds. The timing information is delay time in the navigation data reception timing in each reception channel with respect to a reference pulse generated by the clock generator 34, that is, delay time $\Delta Ta$ to $\Delta Td$ in the reception timings for preamble data (leading 8-bit data for synchronization) in the first subframe shown in FIG. 6. An error is present in the delay time. Thus, the delay time multiplied by light speed is called a pseudo distance.

Then, after the reception operation is started, the controller 33 determines whether or not the timing information on the four satellites and all of the ephemeris information on each of the satellites has been successfully obtained. If timing information on the four satellites and all of the ephemeris information on each satellite has been successfully obtained (YES in step S2), the controller 33 powers off all the reception units $31_4$ to $31_4$ at the moment of the obtainment. The controller 33 thus allows the calculation processor 32 to execute an accurate positional calculation using the timing information on the four satellites and all of the ephemeris information (step S3).

Thereafter, the controller 33 calculates the current time for a time zone based on the accurate position calculated by the calculation processor 32. The controller 33 then notifies the clock unit 4 of the current time information and the general positional area information (city name and the like) indicative of the point of use (step S4). That is, the controller 33 first determines the time zone involving the district corresponding to the point of use based on the calculated position. In accordance with the time difference in the determined time zone, the controller 33 then corrects the GPS time indicated by the time information (specifically TOW) included in the navigation data. The controller 33 then notifies the clock unit 4 of the corrected time as current time information. Furthermore, the controller 33 searches the memory 33a for, for example, the city name of the district area including the calculated position, and notifies the clock unit 4 of the city name.

Then, the clock unit 4 updates the current time and general positional area information (city name and the like) to be made known (displayed) to the user (step S13 in FIG. 4). At the moment of the updating, the clock unit 4 stops supplying power to the GPS receiver 3, thus finishing one time setting operation.

On the other hand, it is assumed that in contrast to the above-described case, the reception environment for GPS signals is inappropriate, preventing the accurate positional calculation based on the timing information on the four satellites and all of the ephemeris information on each satellite.

Then, the controller 33 allows the calculation processor 32 to execute a general positional calculation in accordance with the following procedure corresponding to the current reception environment.

That is, it is assumed that the timing information on the four satellites has been successfully obtained but that not all of the ephemeris information on each satellite has been obtained (NO in step S2). Then, the control section 32 determines whether or not at least basic information in the ephemeris information on each satellite which is commonly called six orbital elements has been obtained (step S5). FIG. 7 is a diagram of a data configuration showing the integral part of the navigation data. As is well known, satellite time is described in the first subframe of the navigation data. The ephemeris is described in the second and third subframes. The almanac is described in the fourth and fifth subframes. In each of the subframes, predetermined data is described at positions indicated by respective word numbers. Six data shown by E1-E6 in FIG. 7 correspond to the six orbital elements included in the ephemeris and almanac.

If the six orbital elements have been successfully obtained (YES in step S5), the controller 33 powers off all the reception units $31_1$ to $31_4$ at the moment of the obtainment. The controller 33 then allows the calculation processor 32 to execute a general positional calculation using the timing information on the four satellites and only the six orbital elements of each satellite (step S6). In this case, positioning accuracy is about ±300 m. Thereafter, the controller 33 determines the time zone of the point of use based on the calculated general position. The controller 33 further calculates the current time based on the determined time zone. The controller 33 then notifies the clock unit 4 of the current time information and the general positional area information indicative of the point of use (step S7).

Then, the clock unit 4 updates the current time and general positional area information (city name and the like) to be made known (displayed) to the user (step S13 in FIG. 4). At the moment of the updating, the clock unit 4 stops supplying power to the GPS receiver 3, thus finishing one time setting operation.

Furthermore, it is assumed that the reception environment for GPS signals is inappropriate compared to that described above but that the timing information on three satellites and all of the ephemeris information on each satellite has been obtained (NO in step S5 and YES in step S8). Then, the controller 33 powers off all the reception units $31_1$ to $31_4$ at the moment of the obtainment. The controller 33 then allows the calculation processor 32 to execute a general positional calculation using the timing information on the three satellites and the ephemeris information (step S9). That, is, the controller 33 allows to calculation procession section 32 to execute a general positional calculation on the assumption that the GPS reception apparatus is present on the earth surface.

Also in this case, the controller 33 determines the time zone of the point of use based on the calculated general position. The controller 33 further calculates the current time based on the determined time zone. The controller 33 then notifies the clock unit 4 of the current time information and the general positional area information indicative of the point of use (step S7).

Moreover, it is assumed that timing information on three satellites has been successfully obtained but that not all of the ephemeris information on each satellite has been successfully obtained (NO in step S8). Then, provided that at least the six orbital elements of the ephemeris information on each satellite have been successfully obtained (YES in step S10), the controller 33 powers off all the reception units $31_1$ to $31_4$ at the moment of the obtainment. The controller 33 then allows the calculation processor 32 to execute a general positional calculation using the timing information on the three satellites and only the six orbital elements of each satellite (step S11). That is, as is the case with step 39 described above, the controller 33 allows the calculation processor 32 to execute a general positional calculation on the assumption that the GPS reception apparatus is present on the earth surface. In this case, positioning accuracy is about ±500 m.

Also in this case, the controller 33 determines the time zone of the point of use based on the calculated general position. The controller 33 further calculates the current time based on the determined time zone. The controller 33 then notifies the clock unit 4 at the current time information and the general positional area information indicative of the point of use (step S7).

On the other hand, it is assumed that timing information on three satellites and the six orbital elements of each of the three elements have failed to be obtained owing to, for example, a more inappropriate reception environment for electromagnetic signals, that is, the reception conditions correspond to none of the above-described ones (NO in step S10). Then, the controller 33 powers off all the reception units $31_1$ to $31_4$ (step S12). The controller 33 then proceeds to step S14 in FIG. 4 to execute the following processing.

That is, it is assumed that timing information on at least three satellites has been successfully obtained (YES in step S14) and that an operation of re-receiving GPS signals has not been performed yet (NO in step S15). Then, as shown in FIG. 5, the controller 33 determines whether or not at least the six orbital elements of the ephemeris information have been successfully obtained for each of any two of the at least three satellites for which timing information has been successfully obtained. If the six orbital elements have failed to be obtained (NO in step S16), the controller 33 immediately proceeds to processing in step S33 in FIG. 4 to determine that the positional calculation is impossible. The controller 33 then notifies the clock unit 4 of positioning result information indicating that whether or not the time zone has changed is unknown. Then, the clock unit 4 displays, for example, a message that urges the user to move to another place to re-execute time setting (step S35). Thus, one time setting operation is finished.

On the other hand, it is assumed that in contrast to the above-described case, the determination in step S16 described above is YES and that the six orbital elements have been successfully obtained for any two satellites. Then, the controller 33 allows only the reception units 31 for the reception channels corresponding to the satellites to be powered on to start the second reception operation, at a timing corresponding to an insufficient information position for a satellite (one or two satellites) for which the timing information has been successfully obtained but the ephemeris information is insufficient. The controller 33 then waits for reception for a predetermined period required to obtain lacking ephemeris information (step S17).

Then, it is assumed that within the above-described predetermined period, the timing information on the four satellites and all of the ephemeris information on each satellite have been successfully obtained, that is, all of the ephemeris information has been obtained for all the satellites for which the ephemeris information has been insufficient (YES in step S18). Then, the controller 33 returns to the processing in step S3 in FIG. 3 described above. The controller 33 then allows the calculation processor 32 to execute an accurate positional calculation. Thereafter, the controller 33 calculates the current time for the time zone based on the calculated accurate position. The controller 33 then notifies the clock unit 4 of the current time information and the general positional area information indicative of the point of use (step S4).

Furthermore, it is assumed that the above-described reception conditions have not been met but that the timing information on the four satellites and at least the six orbital elements of the ephemeris information on each satellite have been successfully obtained (NO in step S18 and YES in step S19). Then, the controller 33 returns to the processing in step S6 in FIG. 3. The controller 33 then allows the calculation processor 32 to execute a general positional calculation. Thereafter, the controller 33 calculates the current time for the time zone based on the calculated general position. The controller 33 then notifies the clock unit 4 of the current time information and the general positional area information indicative of the point of use (step S7).

Moreover, it is assumed that the above-described reception conditions have not been met but that timing information on three satellites and all of the ephemeris information on each satellite have been successfully obtained (NO in step S19 and YES in step S20). The controller 33 returns to the processing in step S9 in FIG. 3 described above. Then, the controller 33 executes a general positional calculation, and calculates the current time for the time zone based on the calculated general position. The controller 33 then notifies the clock unit 4 of the current time information and the general positional area information indicative of the point of use (step S7).

Furthermore, it is assumed that the above-described reception conditions have not been met but that timing information on three satellites and at least the six orbital elements of the ephemeris information on each satellite have been successfully obtained (NO in step S20 and YES in step S21). Then, the controller 33 returns to the processing in step S11 in FIG. 3. The controller 33 then allows the calculation processor 32 to execute a general positional calculation. Thereafter, the controller 33 calculates the current time for the time zone based on the calculated general position. The controller 33 then notifies the clock unit 4 of the current time information and the general positional area information indicative of the point of use (step S7).

On the other hand, it is assumed that all the determinations in steps S18 to S21 are NO and that none of the above-described conditions are met, that is, even with the second reception operation attempted in step S17, only timing information on three satellites and all of the ephemeris information (or six orbital elements) on two of the three satellites have been obtained. Based on satellite identification information on the remaining one satellite for which the ephemeris information has failed to be obtained, the controller 33 determines whether or not a part of the almanac information on the remaining one satellite is present within a predetermined time (for example, three minutes), that is, the transmitting timing for the particular part of the almanac information on the remaining one satellite comes within the predetermined time. If the transmission timing does not come within the predetermined time (NO in step S22), the controller 33 immediately shifts to processing in step S28 in FIG. 4 described below.

In contrast, if the transmission timing comes within the predetermined time (YES in step S22), the controller 33 powers on only reception channels with high reception sensitivity which are included in the reception channels used to acquire the satellites for which the ephemeris information has been successfully obtained before execution of the above-described re-reception. The controller 33 then allows the reception unit 31 to start a reception operation (second reception operation) for obtaining the part of the almanac information which relates to the remaining one satellite (step S23). Thereafter, after the time needed to obtain the required almanac information elapses, the controller 33 powers off the reception unit 31 (step S24).

Figure 8:
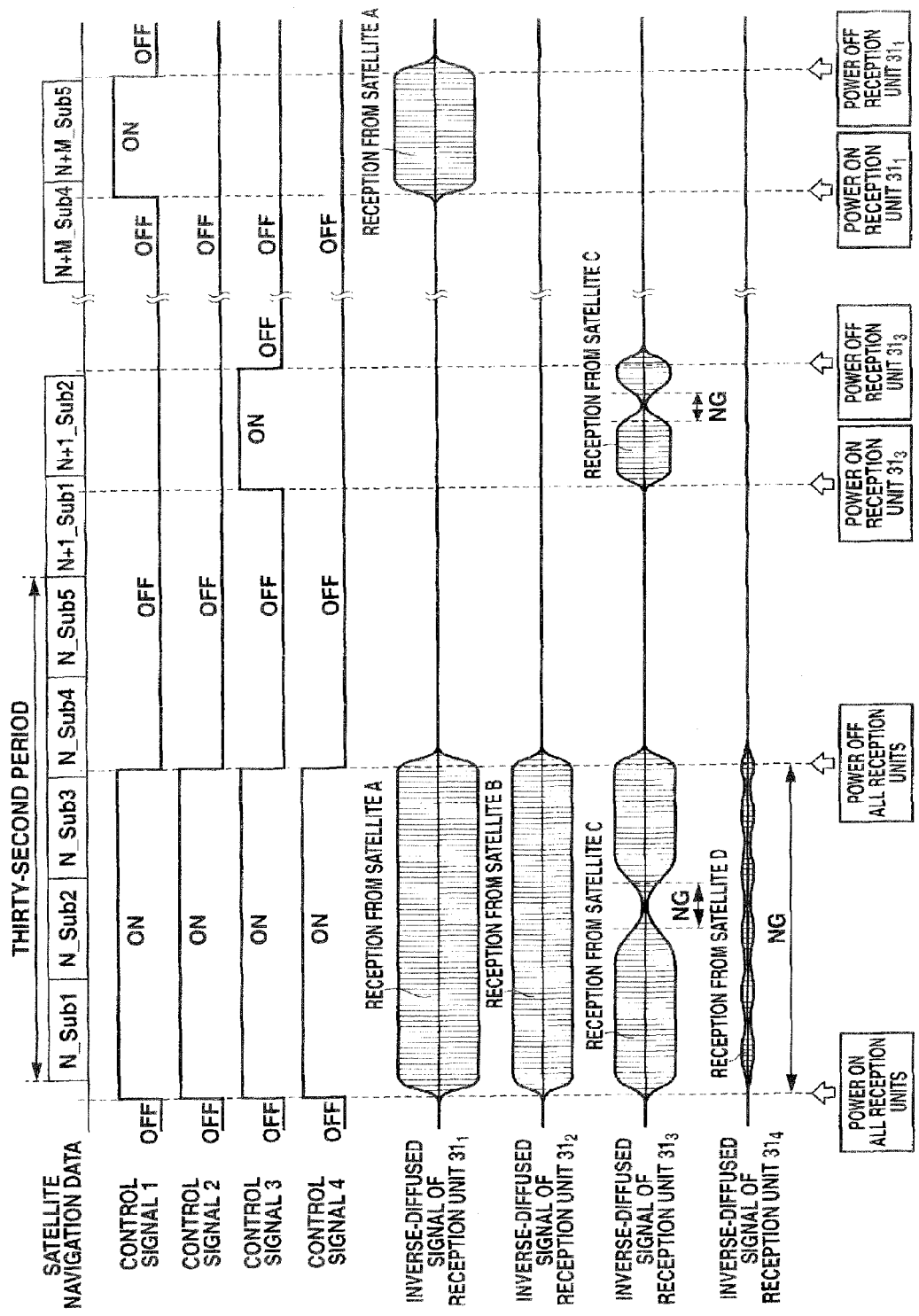
FIG. 8 is a timing chart showing an example of the operation of a GPS receiver during the time setting section.

FIG. 8 is a timing chart showing an example of the operation of the GPS receiver 3 in the above-described processing. In FIG. 8, as a result of a reception operation performed at the beginning of a time setting operation, timing information on three satellites (A, B, and C) has been successfully obtained. Furthermore, for two satellites (A and B), all of the ephemeris information has been obtained, but for the remaining one satellite (C), the six orbital elements of the ephemeris information have not been successfully obtained. Thus, a reception operation (re-reception) intended only to obtain the lacking information on the satellite (C) has been performed but failed. Almanac information on the satellite (C), determined to have been present within a predetermined time, is obtained from a satellite (A) for which all of the ephemeris information has initially been successfully obtained.

If the reception operation started in step S23 has resulted in successful reception of the almanac information (YES in step S25), the controller 33 allows the calculation processor 32 to execute a general positional calculation using the timing information on the three satellites, the ephemeris information (or six orbital elements) on the two satellites, and the almanac information on the remaining one satellite (step S26). This positional calculation is based on the assumption that the GPS reception apparatus is present on the earth surface, as is the case with steps S9 and S11 described above. Furthermore, in this case, positioning accuracy is about ±3 km.

Thereafter, the controller 33 determines the time zone for the point of use based on the calculated general position. The controller 33 further calculates the current time based on the determined time zone. The controller 33 then notifies the clock unit 4 of the current time information and the general positional area information indicative of the point of use (step S27). Then, the clock unit 4 updates the current time and city name and the like to be made known (displayed) to the user (step S13 in FIG. 4). Thus, one time setting operation is finished.

If the reception operation started in step S23 has failed to allow the almanac information to be received (NO in step S25), the flow immediately shifts to the processing in step S28 in FIG. 4 described below.

Moreover, instead of the above-described processing, the processing in step S28 and the subsequent steps is executed in the following case. The determination in step S14 in FIG. 4 is NO and the reception operation performed at the beginning of the time setting operation has failed to obtain timing information on at least three satellites, or the determination in step S15 is YES and the reception operation in step S17 described above has failed to obtain timing information on three satellites and the six orbital elements of each of the three satellites, or the determination in step S22 or S25 is NO and the required almanac information is not present within a predetermined time or has failed to be obtained.

In this case, the controller 33 first determines, at the corresponding moment, whether or not timing information on any two satellites and at least the six orbital elements of each of the two satellites have been successfully obtained. If the timing information on any two satellites and at least the six orbital elements of each of the two satellites have failed to be obtained (NO in step S28), the controller 33 determines that the positional calculation is impossible as described above. The controller 33 then notifies clock unit 4 of positioning result information indicating that whether or not the time zone has changed is unknown (step S33). Then, the clock unit 4 displays, for example, a message that urges the user to move to another place to re-execute time setting (step S35). Thus, one time setting operation is finished.

Moreover, it is assumed that in contrast to the above-described case, the timing information on any two satellites and at least the six orbital elements of each of the two satellites have been successfully obtained (YES in step S28). Then, the controller 33 allows the calculation processor 32 to calculate a trajectory line which corresponds to an area including the current position (reception position) and which has a predetermined width on the earth surface, based only on the information on the two satellites (step S29). That is, the controller 33 allows the calculation processor 32 to calculate the difference between the distances to the respective two satellites and to calculate a band-like area centered at the intersecting line between the earth surface and a rotating hyperbola composed of countless numbers of points with a given difference between the distances to the respective two satellites and formed using the two satellites as foci, the band-like area having a given width (about ±10 km) corresponding to a calculation error in the distances to the respective two satellites.

Figure 9:
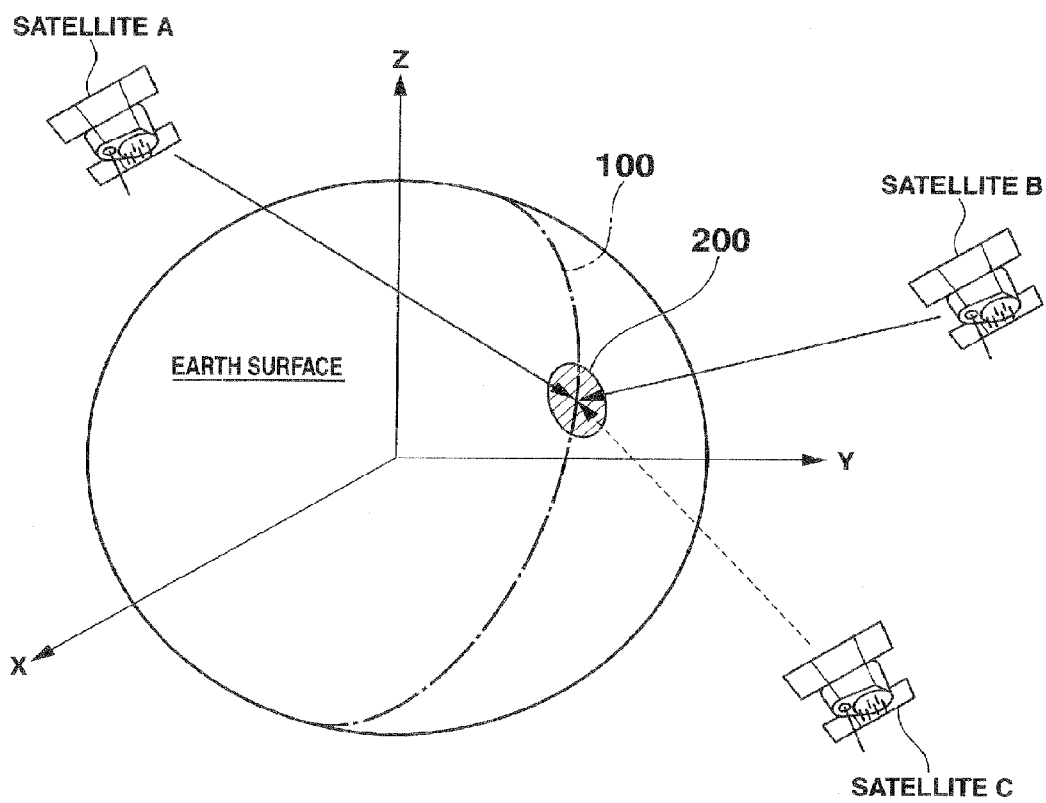
FIG. 9 is a schematic diagram showing a trajectory line on the earth surface calculated based on timing information on two satellites and ephemeris information on each satellite.

FIG. 9 is a diagram schematically showing a trajectory line 100 calculated by the calculation processor 32. As shown in FIG. 9, when timing information on any three satellites (A, B, and C) and the six orbital elements of each of the three satellites have been successfully obtained at the same point, the trajectory line 100 traverses a general positional area (±several kilometers from the general position) 200 on the earth surface.

On this assumption, in the subsequent step S30, the controller 33 determines whether or not the trajectory line calculated by the calculation processor 32 traverses a particular district area (a particular area on a map) stored in the memory 33a of the controller 33 as general positional area information. The particular district area corresponds to the reception position calculated during the last time setting operation as the current position, or a district area corresponding to the city name or the like selected by the user during the setting of the point of use, that is, the already set general positional area.

If the trajectory line traverses the set general positional area (YES in step S30), the controller 33 determines that the time zone has not changed. The controller 33 thus calculates the current time based on the time zone corresponding to the set general positional area. The controller 33 then notifies the clock unit 4 of the current time information (step S31). Then, the clock unit 4 updates the current time to be made known (displayed) to the user (step S32). Thus, one time setting operation is finished.

If the trajectory line does not traverse the set general positional area (NO in step S30), the controller 33 determines that the positional calculation is impossible. The controller 33 then notifies the clock unit 4 of the positioning result information indicating that the general positional area has changed (step S34). Then, the clock unit 4 displays, for example, a message that urges the user to move to another place to re-execute time setting (step S35). Thus, one time setting operation is finished.

As described above, even if the reception environment for GPS signals is inappropriate, preventing the accurate positional calculation based on the timing information on the four satellites and all of the ephemeris information on each satellite, the GPS reception apparatus according to the present embodiment executes a general positional calculation depending on the current reception environment. In this case, if a two consecutive operations for receiving GPS signals (reception operations in steps S1 and S17) have failed to obtain timing information on three satellites and all of the ephemeris information on (at least the six orbital elements of) each satellite, then the GPS reception apparatus according to the present embodiment performs the following operation. Under the condition that timing information on at least three satellites and ephemeris information on (at least the six orbital elements of) any two satellites have been successfully obtained, the GPS reception apparatus performs a reception operation (in step S23) of obtaining, instead of the ephemeris information on the remaining one satellite, that is, the particular satellite for which the timing information has been successfully obtained, a part of the almanac information which relates to the general orbit of the satellite from the ephemeris information on (at least the six orbital elements of) the two satellites. The GPS reception apparatus then executes a general positional calculation based on the obtained almanac information, the timing information on the at least three satellites, and the ephemeris information on (at least the six orbital elements of) the two satellites.

Therefore, the general current position can be obtained even with the inappropriate reception environment for GPS signals. This eliminates the need to unnecessarily increase the number of operations of receiving GPS signals, thus saving power. Furthermore, the point of use required for time setting can be determined with a high probability.

Here, the present embodiment performs a reception operation for obtaining a part of the almanac information relating to the general orbit of the particular satellite for which the ephemeris information has failed to be obtained even with the second reception operation, under the condition that the transmission timing for the almanac information comes within a predetermined time. This eliminates the need to perform reception operations for a long time in order to obtain the almanac information, thus further saving power.

Furthermore, in the present embodiment, when the first reception operation allows timing information to be obtained for at least three satellites, while allowing ephemeris information to be obtained for only two satellites, a reception operation for obtaining the lacking ephemeris information is performed. Then, if the ephemeris information still fails to be obtained, a reception operation for obtaining almanac information used instead of the ephemeris information is performed. However, the following operation is possible.

For example, when the first reception operation allows timing information to be obtained for at least three satellites, while allowing ephemeris information to be obtained for only two satellites, if the transmission timing for the almanac information used instead of the ephemeris information is to come within a predetermined time even before the reception operation for obtaining the lacking ephemeris information is performed, the reception operation for obtaining the almanac information may be performed at that timing. Then, only if the ephemeris information fails to be obtained after the almanac information has been obtained, positional calculation may be executed using the almanac information already obtained.

Additionally, in the present embodiment, the upper limit of the number of GPS signal receiving operations performed to obtain ephemeris information on at least three satellites is two. However, if the accurate positional calculation is given top priority over the power saving, the upper limit may be at least three. Even in this case, if the ephemeris information is finally obtained for only two satellites, the point of use required for time setting can be determined with a high probability by executing positional calculation using the almanac information.

Furthermore, in the present embodiment, if the ephemeris information is obtained for only two satellites, a constantly new reception operation (second reception operation) is performed to obtain the almanac information used instead of the lacking ephemeris information. However, for example, if the almanac information stored in the memory 33a is relatively new, information included in the stored almanac information may be used without the need to receive new almanac information.

Furthermore, the GPS reception apparatus according to the present embodiment calculates the current position by the accurate positional calculation or the general positional calculation depending on the reception environment for GPS signals. Furthermore, based on the calculated current position, the GPS reception apparatus according to the present embodiment first determines the time zone involving the district corresponding to the point of use, and then corrects the GPS time in accordance with the time difference in the determined time zone. The GPS reception apparatus then notifies the clock unit 4 of the corrected time as current time information.

In this case, if the reception environment for GPS signals is inappropriate and only timing information on any two satellites and ephemeris information (all of the ephemeris information or the six orbital elements) on any two satellites have been obtained even with two consecutive operations of receiving GPS signals (reception operations in steps S1 and S17), the following operation is performed as described above. A trajectory line is calculated based on the ephemeris information on the two satellites. Whether or not the point of use has changed is determined based on the trajectory line. Then, if the point of use has not changed, the GPS time is corrected in accordance with the time difference in the time zone corresponding to the already set general positional area. Thus, the current time is obtained.

Hence, provided that the point of use has not changed significantly, even if during the time setting operation, the reception environment for GPS signals is inappropriate, preventing not only the accurate current position but also the general current position from being calculated, the current time corresponding to the point of use can be determined simply by obtaining timing information on at least two satellites and ephemeris information on (at least the six orbital elements of) each of these satellites. Therefore, the current time can be obtained in more various use environments.

Here, in the present embodiment, even when timing information on two satellites is successfully obtained, if it has been impossible to obtain at least the six orbital elements of each of the two satellites (NO in step S28), the current time not immediately obtained. However, for example, if the almanac information stored in the memory 33a is relatively new, a trajectory line is calculated using the information on the general orbits of the two satellites which information is included in the almanac information.

Then, based on the trajectory line, whether or not the point of use has changed is determined. If the point of use has not changed, the current time is obtained by correcting the GPS time in accordance with the time difference in the time zone corresponding to the already set general positional area.

Furthermore, in the present embodiment, the GPS reception apparatus configured as follows has been described. Even if the reception environment for GPS signals is inappropriate, thus preventing the accurate positional calculation based on the information on the four satellites and all of the ephemeris information on each satellite, the general positional calculation is executed depending on the current reception environment. However, the present invention is not limited to this aspect. The current time obtaining method according to the present invention is applicable to a GPS reception apparatus configured to always perform an accurate positional calculation during a time setting operation.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A reception apparatus comprising:
a storage unit configured to store a set district of use of the reception apparatus;
a reception unit configured to receive global positioning system signals transmitted by a plurality of satellites;
a first determination unit configured to determine whether or not a state of reception by the reception unit is a predetermined reception state in which the reception unit obtains timing information and six orbital elements information from the global positioning system signals transmitted by only two of the satellites;
a calculation unit configured to calculate trajectory line having a predetermined width on a surface of the earth, based on the global positioning system signals transmitted by the two satellites when the first determination unit determines that the state of reception by the reception unit is the predetermined reception state;
a second determination unit configured to determine whether or not the trajectory line calculated by the calculation unit traverses the district of use stored in the storage unit; and
a time correcting unit configured to (i) obtain a current time using the timing information obtained by the reception unit, by correcting the timing information based on a time zone corresponding to the district of use, when the second determination unit determines that the trajectory line traverses the district of use, and (ii) not obtain the current time using the timing information obtained by the reception unit, when the second determination unit determines that the trajectory line does not traverse the district of use.

2. The reception apparatus according to claim 1, further comprising a notification unit which notifies a user that the current time cannot be obtained, when the second determination unit determines that the trajectory line does not traverse the district of use.

3. The reception apparatus according to claim 1, wherein the district of use stored by the storage unit is a region selected by a user.

4. The reception apparatus according to claim 1, wherein the district of use stored by the storage unit is set based on a prior positioning operation performed using global positioning system signals received by the reception unit.

5. A current time obtaining method for an apparatus comprising a global positioning system receiver and a clock, the method comprising:
determining whether or not a state of reception by the global positioning system receiver is a predetermined reception state in which the global positioning system receiver obtains timing information and six orbital elements information from global positioning system signals transmitted by only two global positioning system satellites;

calculating, by the global positioning system receiver, a trajectory line having a predetermined width on a surface of the earth, based on the global positioning system signals transmitted by the two satellites, when it is determined that the state of reception by the global positioning system receiver is the predetermined reception state;

determining, by the global positioning system receiver, whether or not the calculated trajectory line traverses a district of use of the apparatus, which has been stored by the apparatus; and obtaining, by the global positioning system receiver, a current time using the timing information obtained by the global positioning system receiver, by correcting the timing information based on a time zone corresponding to the district of use, when it is determined that the trajectory line traverses the district of use, and displaying the current time by the clock;

wherein the global positioning system receiver does not obtain the current time using the timing information obtained by the global positioning system receiver, when it is determined that the trajectory line does not traverse the district of use.

6. The method according to claim 5, further comprising notifying a user via the clock that the current time cannot be obtained, when it is determined that the trajectory line does not traverse the district of use.

7. The method according to claim 5, further comprising setting the district of use in accordance with a region selected by a user.

8. The method according to claim 5, further comprising setting the district of use based on a prior positioning operation performed by the global positioning system receiver.

9. A reception apparatus comprising:
(i) a global positioning system receiver comprising:
a memory configured to store a set district of use of the reception apparatus;
a controller configured to execute a program to perform operations comprising:
determining whether or not a state of reception by the global positioning system receiver is a predetermined reception state in which the global positioning system receiver obtains timing information and six orbital elements information from global positioning system signals transmitted by only two global positioning system satellites, obtaining a trajectory line having a predetermined width on a surface of the earth, the trajectory line being calculated based on the global positioning system signals transmitted by the two satellites, when the controller determines that the state of reception by the global positioning system receiver is the predetermined reception state, determining whether or not the calculated trajectory line traverses the district of use stored in the memory, and obtaining a current time using the obtained timing information by correcting the timing information based on a time zone corresponding to the district of use, when the controller determines that the trajectory line traverses the district of use, wherein the controller does not obtain the current time using the obtained timing information, when the controller determines that the trajectory line does not traverse the district of use; and (ii) a clock configured to display the current time obtained by the controller of the global positioning system receiver.

10. The reception apparatus according to claim 9, wherein the clock is configured to notify a user that the current time cannot be obtained, when the controller of the global positioning system receiver determines that the trajectory line does not traverse the district of use.

11. The reception apparatus according to claim 9, wherein the district of use stored by the memory is a region selected by a user.

12. The reception apparatus according to claim 9, wherein the district of use stored by the memory is set based on a prior positioning operation performed using global positioning system signals received by the global positioning system receiver.

* * * * *